A. W. CASH.
DEVICE FOR KILLING OR DISABLING INSECTS, FLIES, OR THE LIKE.
APPLICATION FILED OCT. 30, 1915.
1,179,162.  Patented Apr. 11, 1916.
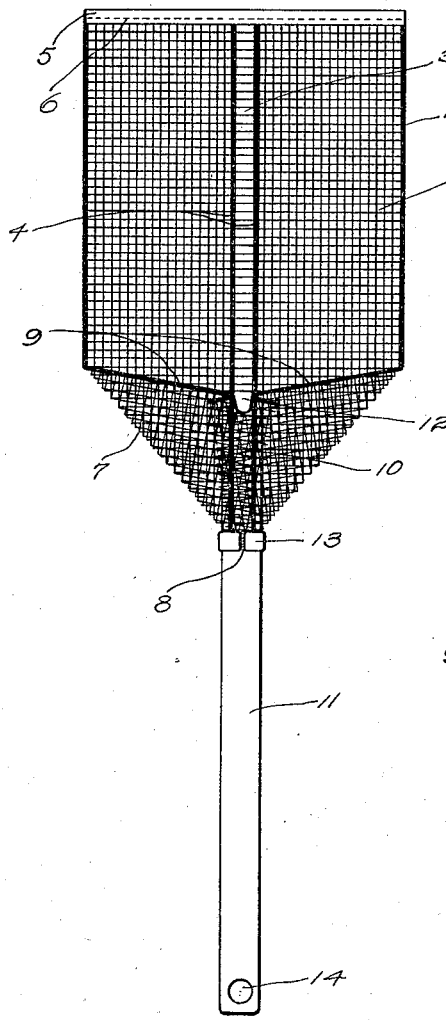
Fig. 1.
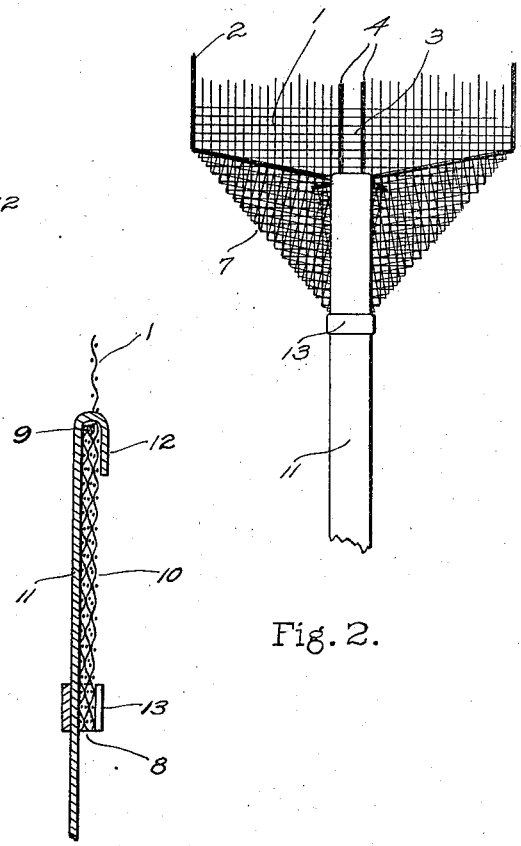
Fig. 2.
Fig. 3.
Witnesses  Inventor
M. E. Berg  By Arthur W. Cash
Nora Graham  La Porte, Bean & Graham
 Att'y.

UNITED STATES PATENT OFFICE.

ARTHUR W. CASH, OF DECATUR, ILLINOIS, ASSIGNOR TO UNITED STATES WIRE MAT COMPANY, OF DECATUR, ILLINOIS, A CORPORATION OF ILLINOIS.

DEVICE FOR KILLING OR DISABLING INSECTS, FLIES, OR THE LIKE.

1,179,162. Specification of Letters Patent. Patented Apr. 11, 1916.

Application filed October 30, 1915. Serial No. 58,750.

*To all whom it may concern:*

Be it known that I, ARTHUR W. CASH, a resident of Decatur, county of Macon, and state of Illinois, have invented certain new and useful Improvements in Implements or Devices for Killing or Disabling Insects, Flies, or the like, of which the following is a specification.

My invention relates to improvements in devices for killing or disabling insects and the like, and has particular reference to devices which are commonly called fly killers and fly swatters.

The principal object of this invention is the provision of a handle construction which is simple and effective, having a secure attachment or anchorage to the body of the killer and bracing the same so as to permit the necessary flexing without injury or damage thereto.

A further object of this invention is the provision in combination with a fly killer body composed of a suitable fabric having its lower corner portions folded over each other, and the lower end converging to a point, of a handle member having a bendable lug adapted to project through the body of the killer, and also having a clamping member adapted to engage the said pointed extremity of the body portion, whereby the body portion and handle are securely connected together.

To the accomplishment of the foregoing and such other objects as may hereinafter appear, my invention consists in the combination, construction and arrangement of parts hereinafter described and then sought to be defined in the appended claims, reference being had to the accompanying drawings forming a part hereof, and which shows merely for the purpose of illustrative disclosure, a preferred embodiment of my invention, it being understood that various changes may be made in practice within the scope of the claims, without digressing from my inventive idea.

In the drawings Figure 1 is an elevation of a killer embodying my invention, showing what may be termed the rear of the device; Fig. 2 is a similar view of the front of the device showing part of a body and handle; and Fig. 3 is a longitudinal and medial cross-section on an enlarged scale, of part of the handle and the lower part of the body of the device, that is, substantially the parts shown in Fig. 2.

Referring now to the drawings, the numeral 1 designates the body portion of the killer which is shown preferably formed of a suitable wire netting or the like, being substantially rectangular in shape. This body portion may be of different shapes and may be formed of netting made in different ways, that in the illustration being provided with the reinforced longitudinal selvage edges 2 and the central spacing 3, having on each side a plurality of wires which are positioned close together to form medial reinforcements 4. The body of the killer is also provided with the flexible binding 5 on the outer end which is stitched between the meshes removed from the edge as at 6, so as to prevent the binding from being pulled off or disengaged.

The lower corner portions of the body are folded over upon the body portion along lines 7 which converge downwardly to the point 8 which forms the lower extremity of said body portion. In thus folding these lower corner portions, the longitudinal reinforcements extend inwardly and obliquely to form the oblique stays or braces 9, which intersect each other at a point in the central line extending longitudinally through the body portion of the device. These lower corner portions which are folded, extend over each other as at 10.

The handle member is designated generally by the reference character 11. This is formed preferably of cold-rolled steel or other suitable material which may be stamped or otherwise operated on, to be shaped as hereinafter described. Its upper end is provided with the lug or flap 12 which is adapted to extend through the body of the device and be bent down against the other side thereof. As this lug or flap is positioned in the middle of the upper end of the handle and as the handle is positioned so that its upper end extends to the intersection of the oblique stays or braces 9, the lug or flap engages the body of the device at this point, thereby not only holding the handle to the body, but also holding the lower corner portions and the oblique stays or braces 9, which are the free edges, closely to the body of the device. In this connection, I also provide the clamping member 13 which is in the form of a strap extending entirely around an intermediate portion of the handle 11 and it engages the pointed extremity 8 of the body of the device and clamps it to the handle, the strap being pressed or stamped so as to hold the parts securely together. It is therefore seen that the body and handle are secured together at two points, one being the lower extremity of the body and the other at the intersection of the obliquely extending stays or braces. The handle itself between these two points, provides a very efficient brace for the lower portion of the body of the device and without interfering with the desirable flexibility, which is so necessary for efficient operation and utilization of the device. I also wish to call attention to the fact that the handle member is provided with the perforation 14, whereby it may be readily hung in a convenient position and that the flat nature of the handle makes it convenient to grasp and also permits the killer to be hung without projecting in the way.

It is therefore seen that I have provided a very simple and efficient form of killer and particularly, a very simple and efficient form of handle construction. This may be made with the fewest possible operations and may be applied to the body of the device readily. It is obvious that I may utilize this handle construction in connection with other forms of killer bodies, the one shown in the drawing being merely for the purpose of illustrative disclosure.

What I claim is:—

1. A device for killing and disabling insects and the like, including in combination, a body member, a handle member having a bendable lug thereon projecting through the body member and bent down upon the opposite side thereof, and a clamping member associated with an intermediate part of said handle member and clamping a lower portion of the body member to the handle member.

2. A device for killing and disabling insects and the like, including in combination a body member having obliquely extending and intersecting braces provided in its lower portion, a handle member having a bendable lug projecting through the body member and bent down upon the opposite side thereof so as to engage the oblique braces at their intersection and secure said braces, body, and handle together, and a clamping member associated with an intermediate part of said handle member and clamping the lower portion of the body member to the handle member.

3. A device for killing and disabling insects and the like, including in combination a body member substantially rectangular in shape but having its lower corner portions folded along a line converging to a point, the upper edges of said folded portions intersecting at a medial point, a handle member having a bendable lug or flap projecting through the body portion and bent down against the other side thereof, said lug or flap being positioned at said intersection of the edges of the folded portions, and the clamping member associated with the handle member and clamping the lower extremity of the body portion to the handle member.

4. A device for killing and disabling insects and the like, including in combination a body member substantially rectangular in shape but having its lower corner portions folded along a line converging to a point, the upper edges of said folded portions intersecting at a medial point, a handle member having a bendable lug or flap projecting through the body portion and bent down against the other side thereof, said lug or flap being positioned at said intersection of the edges of the folded portions, and the clamping member associated with the handle member and clamping the lower extremity of the body portion to the handle member, said clamping member being in the form of a strap surrounding said handle member and engaging said lower extremity of the body.

5. A device for killing and disabling insects and the like including in combination a body member formed of a netting, said body member being substantially rectangular in shape and having reinforced selvages and a medial spacing with reinforcement on either side thereof, the lower corner portions of the body member being folded over each other so that it terminates in a pointed extremity and so that the reinforced selvages extend obliquely and intersect in the line of said central spacing, a handle member having a bendable lug on its upper end projecting through the central spacing and being bent down upon the opposite side of the body member to engage the obliquely extending selvages at their intersection and to secure said selvages, body, and handle together, and a clamping member associated with an intermediate portion of the handle and engaging the lower pointed extremity to connect the body and handle together.

ARTHUR W. CASH.

Copies of this patent may be obtained for five cents each, by addressing the "Commissioner of Patents, Washington, D. C."